2,976,247
Patented Mar. 21, 1961

2,976,247
CORROSION INHIBITED ANTIFREEZE COMPOSITIONS

James K. Truitt, Beacon, N.Y., assignor to Texaco Inc., a corporation of Delaware No Drawing. Filed May 15, 1958, Ser. No. 735,397

13 Claims. (Cl. 252—78)

This invention relates to novel corrosion inhibited antifreeze compositions and to aqueous solutions thereof. The invention also covers a method of producing the novel antifreeze compositions and a method of reducing the corrosion of metals comprising heat exchange apparatus.

With the increasing use of aluminum in heat exchange systems such as aluminum engine blocks and aluminum radiators for automobiles, many of the presently known inhibited antifreeze compositions have been found undesirable in that they either fail to retard the corrosion of aluminum or actually promote the corrosion thereof.

An object of this invention is to provide novel antifreeze compositions and aqueous solutions thereof which afford superior corrosion protection to aluminum and solder. Another object is to provide a method which reduces the corrosion of aluminum and solder in contact with antifreeze fluids.

In accordance with this invention, I have discovered an antifreeze composition and aqueous solutions thereof comprising a water soluble liquid freezing point depressant and a corrosion inhibitor of the formula

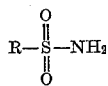

wherein R is a member selected from the group consisting of aryl and alkaryl monovalent hydrocarbon radicals of less than 15 carbon atoms which provide superior corrosion protection to aluminum and solder metals.

The freezing point depressants of my novel compositions are any of the water miscible liquid alcohols such as the monohydroxy lower alkyl alcohols and the liquid polyhydroxy alcohols such as the alkylene glycols. Specific examples of the alcohols contemplated herein are methanol, ethanol, propanol, isopropanol, butanol, ethylene glycol, diethylene glycol, propylene glycols and mixtures thereof. The freezing point depressant should generally constitute between about 10 and 100% by volume (vol.) of the novel antifreeze compositions, the balance being water. A preferred alcohol is ethylene glycol which, as sold commercially, often contains a small amount up to 10% by weight of diethylene glycol. The term ethylene glycol as used herein is intended to read either on the pure or commercial compound. This is also true for the other freezing point depressant alcohols contemplated herein.

The inhibitor components of the novel antifreeze compositions are the arylsulfonamides and the alkarylsulfonamides as heretofore defined. Specific examples of the inhibitors contemplated herein are benzenesulfonamide, p-toluenesulfonamide, o-toluenesulfonamide, p-ethylbenzenesulfonamide, p-octylbenzenesulfonamide, 1,2 dimethylbenzene-4-sulfonamide, α-naphthysulfonamide, and 1-methylnaphthyl-2-sulfonamide, to mention only a few.

The quantity of sulfonamide inhibitor in the novel antifreeze compositions should generally be between 0.1 and 7%, preferably between about 1 and 4%, based on the weight of the alcohol freezing point depressant.

Water may be combined with the novel antifreeze concentrate, i.e., alcohol plus inhibitor, to form the aqueous antifreeze solutions thereof. When the aqueous solutions of the novel antifreeze concentrates are to be used as coolants in automotive cooling systems, the water miscible liquid alcohol should generally constitute at least about 10 volume percent, preferably between about 20 and 90 volume percent of the aqueous antifreeze solutions. The corresponding water content should, therefore, be less than about 90 volume percent, preferably between about 10 and 80 volume percent, of the aqueous compositions.

It is to be noted that freezing point of the antifreeze mixtures is substantially determined by the quantity and particular freezing point depressant used therein. For example, a minimum freezing point of approximately −60° F. is obtained with about 60% ethylene glycol by volume. Further increase or decrease in the ethylene glycol concentration in the aqueous antifreeze raises the freezing point.

In the preparation of my novel antifreeze concentrates and aqueous solutions thereof, the sulfonamide inhibitor is added to the freezing point depressant with mixing, preferably at elevated temperatures, e.g., between about 100 and 200° F., in order to enhance the solution of the inhibitor in the freezing point depressant. When aqueous solutions of the novel concentrate are to be prepared, water is added directly to the concentrate either at ambient or elevated temperatures with mixing to insure a homogeneous product.

The following examples serve to illustrate my invention in greater detail:

EXAMPLE I

This example illustrates the method of preparation of the novel antifreeze concentrate compositions.

To 10 liters of a commercial grade ethylene glycol (4.1 wt. percent diethylene glycol content), there was added 160 grams of benzenesulfonamide and the resultant mixture was heated with stirring to 130° F. The temperature was held at 130° F. and stirring continued until a clear homogeneous solution was formed.

The final product composition was as follows:

| Ingredient | Wt., Percent |
|---|---|
| Ethylene glycol (commercial) | 98.58 |
| Benzenesulfonamide | [1] 1.42 |

[1] (1.44 based on the wt. of the glycol.)

EXAMPLE II

This example illustrates a method of preparing novel aqueous compositions of this invention.

To 10 liters of a commercial grade ethylene glycol (4.1 wt. percent diethylene glycol contents), there was added 174 grams of p-toluenesulfonamide and the resultant mixture was stirred at room temperature until a homogeneous solution of antifreeze concentrate was formed. Fifteen (15) liters of water was then added with stirring to the concentrate. The resultant aqueous solution and the antifreeze concentrate therein were of the following compositions:

| Aqueous Antifreeze | | Antifreeze Concentrate | |
|---|---|---|---|
| Ingredients | Vol. Percent | Ingredients | Vol. Percent |
| Water | 60 | Ethylene glycol (commercial) | 98.45 |
| Antifreeze Concentrate | 40 | p-toluenesulfonamide | [1] 1.55 |

[1] (1.56% based on the wt. of glycol.)

EXAMPLE III

This example serves to illustrate the corrosion inhibiting effectiveness of the antifreeze compositions of this invention.

The corrosion test employed and which is described below simulates conditions under which corrosion of aluminum and solder is frequently encountered in automotive cooling systems containing antifreeze compositions.

The test is conducted in an open-top Pyrex glass cell of cylindrical shape fitted with a sidearm tube having an entrance into the middle and also into the bottom section of the cell. In addition, an air inlet tube is connected into the middle section of the sidearm tube and an air outlet tube is fitted to the upper side of the cell. The size of the cell is such that when 150 milliliters of liquid is added thereto the liquid level is flush with the bottom edge of the middle entrance of the sidearm tube into the cell.

One hundred-fifty (150) milliliters of a 40% by volume antifreeze solution in water is charged to the cell. The water used to dilute the antifreeze to 40% by volume is of a 200 p.p.m. (by wt.) chloride ion concentration. The air outlet tube is connected to a water cooled condenser and the air inlet tube is connected to a compressed air source. The open top of the cell is closed with a new rolled cork through which is passed a glass rod ending in a pair of glass hooks. From each hook a weighed test metal strip of known surface area is suspended by passing the hook through the hole in the test metal strip.

The glass rod is adjusted so that the test metal strips are immersed in the test solution. The glass cell is then placed in an oil bath maintained at a temperature of 160° F. Air is passed through the air inlet tube at a rate of 100 milliliters per minute into the portion of the test solution located in the sidearm tube, thereby promoting the circulation of the test solution in the cell. The air was previously scrubbed free of any carbon dioxide by passing it through a solution of 20 wt. percent sodium hydroxide and water. The cell is maintained in the oil bath for a period of 48 hours where upon the test metal strips are removed. Each test metal strip is freed of corrosion products, dried and reweighed.

The corrosion rate is calculated on the basis of milligrams lost per square decimeter of original surface area of the test strip per hour (mg./sq. dm./hr.).

All of the metal strips used in the above tests were of 102 x 12.5 x 1.3 millimeter dimension and had a 4 millimeter diameter hole centered 5 millimeters from one end.

The test metal specimens were prepared for test by degreasing in hot benzene vapor for 30 minutes. Solder specimens were then stored in a desiccator until weighed. The aluminum specimens were etched by immersing in a 10% (wt.) solution of sodium hydroxide at 140–160° F. for 5 minutes, rinsed in water, dipped in concentrated nitric acid for 5 seconds, rerinsed in distilled water, wiped with a clean dry cloth and dried in an oven at 140° F. for 10–15 minutes. Both the solder and aluminum test specimens were cooled in the desiccator and weighed.

Following completion of the test, the strips were scrubbed with a soft bristle brush in water to remove loosely adhering corrosion products. The aluminum specimens were then cleaned by immersing in a phosphoric acid-dichromate solution for 10 minutes at 140–160° F., rinsing in water and scrubbing with a brush under water, then wiped and dried in an oven. The phosphoric acid dichromate solution was prepared by dissolving 20 grams of potassium dichromate in 28 milliliters of orthophosphoric acid and diluting with water to 1 liter. The solder specimens were cleaned electrolytically for 3 minutes as cathodes with platinum as the anode in an aqueous solution of 5% sulfuric acid plus 2% pyridine at a temperature of 180° F. and a current density of approximately 15 amperes per square decimeter of surface area, then immersed in distilled water, scrubbed with a bristle brush and dried in an oven. After drying in the oven, both the aluminum and solder strips were cooled in a desiccator and weighed.

Five antifreeze preparations were subjected to the above test. The initial pH of these antifreeze solutions was adjusted to values of 7, 8.5 and 11 using sodium hydroxide. This was done in order to obtain truly comparative corrosion rates since corrosion rates are substantially affected by variance of pH of antifreeze solutions. Antifreezes A and B are aqueous solutions of uninhibited ethylene glycol. Antifreezes C, D and E are representatives of the novel antifreeze compositions of this invention.

Test data and results are reported below in Table I.

*Table I*

| Description | Antifreeze | | | | |
|---|---|---|---|---|---|
| | A | B | C | D | E |
| Composition of Test Solution, Vol. Percent: | | | | | |
| Water (200 p.p.m. Cl-) | 60 | 60 | 60 | 60 | 60 |
| Antifreeze Component | 40 | 40 | 40 | 40 | 40 |
| Composition of Antifreeze Component, Wt. Percent: | | | | | |
| Ethylene Glycol (commercial) | 100 | 100 | 98.6 | 98.6 | 98.5 |
| Benzenesulfonamide | | | 1.4 | 1.4 | |
| p-Toluenesulfonamide | | | | | 1.5 |
| pH of Test Solution (Initial) | 7 | 11 | 7 | 11 | 8.5 |
| Corrosion Rate [1] of Test Strips, mg./sq. dm./hr.: | | | | | |
| Aluminum (2S) | 0.11 | 9.7 | 0.05 | 1.56 | 0.07 |
| Solder | 0.69 | 12.5 | 0.04 | 0.44 | 0.27 |

[1] Corrosion rate for each metal is based on the average weight loss/sq. dm./hr. of 2 test strips.

As can be seen from the above table, for a given pH value, my novel inhibitor antifreezes C, D and E substantially reduce the corrosion of aluminum and solder in comparison with uninhibited antifreeze compositions.

Obviously, many modifications and variations of the invention as hereinbefore set forth may be made without departing from the spirit and scope thereof, and therefore, only such limitations should be imposed as are indicated in the appended claims.

I claim:

1. An antifreeze composition adapted to be added to water consisting essentially of a water soluble liquid alcohol and between about 0.1 and 7% by weight of a corrosion inhibitor of the formula

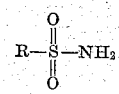

wherein R is a member selected from the group consisting of aryl and alkaryl monovalent hydrocarbon radicals having less than 15 carbon atoms.

2. An antifreeze composition adapted to be added to water consisting essentially of a water soluble liquid alcohol and between about 1 and 4% by weight of a corrosion inhibitor of the formula

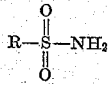

wherein R is a member selected from the group consisting of aryl and alkaryl monovalent hydrocarbon radicals having less than 15 carbon atoms.

3. An antifreeze composition in accordance with claim 1 wherein said alcohol is ethylene glycol and said inhibitor is benzenesulfonamide.

4. An antifreeze composition in accordance with claim 1 wherein said alcohol is ethylene glycol and said inhibitor is p-toluenesulfonamide.

5. An aqueous antifreeze composition consisting essentially of between 10 and 100% by volume of a water soluble liquid alcohol and between about 0.1 and 7% by weight based on the weight of said alcohol of a corrosion inhibitor of the formula

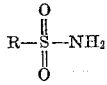

wherein R is a member selected from the group consisting of aryl and alkaryl monovalent hydrocarbon radicals having less than 15 carbon atoms, the remainder of said composition being less than about 90% by volume of water.

6. An aqueous antifreeze solution consisting essentially between about 20 and 90% by volume of a water miscible liquid alcohol and between about 0.1 and 7% by weight based on the weight of said alcohol of a corrosion inhibitor of the formula

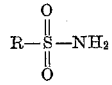

wherein R is a member selected from the group consisting of aryl and alkaryl monovalent hydrocarbon radicals having less than 15 carbon atoms, the remainder of said composition being between about 10 and 80% by volume of water.

7. An aqueous antifreeze composition in accordance with claim 5 wherein said alcohol is ethylene glycol and said inhibitor is benzenesulfonamide.

8. An aqueous antifreeze composition in accordance with claim 5 wherein said alcohol is ethylene glycol and said inhibitor is p-toluenesulfonamide.

9. A composition in accordance with claim 5 wherein said alcohol contains between about 1 and 4% by weight of said inhibitor.

10. A process of inhibiting corrosion of metal selected from the group consisting of aluminum and solder which come in contact with aqueous antifreeze solutions comprising contacting said metal with a composition consisting essentially of between about 10 and 100% by volume of a water miscible liquid alcohol, and between 0.1 and 7% by weight based on the weight of said alcohol of a corrosion inhibitor of the formula

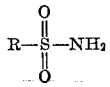

wherein R is a member selected from the group consisting of aryl and alkaryl monovalent hydrocarbon radicals having less than 15 carbon atoms, the remainder of said composition being less than about 90% by volume of water.

11. An antifreeze composition in accordance with claim 1 wherein said water soluble liquid alcohol is ethylene glycol.

12. An aqueous antifreeze composition in accordance with claim 5 wherein said water soluble liquid alcohol is ethylene glycol.

13. A process of inhibiting corrosion of metal in accordance with claim 10 wherein said water miscible liquid alcohol is ethylene glycol.

References Cited in the file of this patent

UNITED STATES PATENTS

| 1,949,775 | Bebie et al. | Mar. 6, 1934 |
| 1,960,295 | Bebie et al. | May 29, 1934 |

FOREIGN PATENTS

| 721,594 | Great Britain | Jan. 12, 1955 |